Patented Aug. 17, 1943

2,327,213

UNITED STATES PATENT OFFICE 2,327,213

CHEMICAL COMPOUNDS AND PROCESS OF PREPARING THE SAME

Josef Pikl, Pitman, N. J., assignor to E. I. du Pont de Nemours & Company, Wilmington, Del., a corporation of Delaware No Drawing. Application February 24, 1940, Serial No. 320,564

14 Claims. (Cl. 260—402.5)

This invention relates to novel organic compounds and to process for preparing the same. More particularly this invention deals with novel isothiouronium compounds, obtainable by condensing thiourea with chloromethyl amides having long-chain alkyl radicals in their structure.

It is an object of this invention to prepare novel water-soluble chemical compounds useful as surface active agents. Further important objects of this invention will appear as the description proceeds.

The novel compounds of this invention are characterized by a structure corresponding to the following general formula

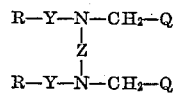

wherein R is an aliphatic or alicyclic hydrocarbon radical, in other words, a non-aromatic hydrocarbon radical, containing at least 7 carbon atoms; Y is a link selected from the group consisting of CO and O—CO, Z stands for a divalent radical such as methylene, ethylene, hexamethylene, phenylene, chloro-phenylene, methoxyphenylene, thio-diphenylene, etc.; in other words, Z is a divalent radical free from water-solubilizing groups, while Q designates an isothiouronium halide radical, attached to the $CH_2$ radical through the S atom, as typified by

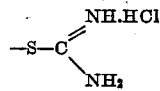

wherein, however, the hydrogen atoms on the nitrogens may be replaced by alkyl or aryl radicals and the Cl may be replaced by Br or other halogen.

These compounds are prepared, according to this invention by reacting with a thiourea on a bis-halogen-methyl compound of the general formula

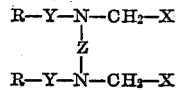

wherein X is halogen while Y, Z and R have the same significance as above.

As typical illustrations of such bis-halogenmethyl compounds, usable for the purpose of this invention, may be mentioned: di(N-chloromethylstearamido)-methane, di-(N-chloromethylpalmitamido) - methane, di - (N-chloromethyloleylamido)-methane, di-(N-chloromethylmyristamido)-methane, di-(N-chloromethyl-lauramido)-methane, di-(N-chloromethyl-caprylamido)-methane, di-(N-bromomethylstearamido)-methane, di-(N-bromomethyl-oleylamido)-methane, di-(N-bromomethyl-lauramido)-methane and analogous chloromethyl and bromomethyl compounds derived from the mixed fatty acids, derived from vegetable or animal fats and oils, for instance coconut oil or palm kernel oil; di - octadecyl - N:N' - di - (chloromethyl) - ethylenedicarbamate, di - octadecyl - N:N' - di - (chloromethyl)-hexamethylenedicarbamate, di - octadecyl-N:N'-di-(chloromethyl) - p -phenylene - dicarbamate, di - octadecyl - N : N' - di - (chloromethyl) - m - phenylene - dicarbamate, di-octadecyl-N:N'-di-(chloromethyl) - o - phenylene-dicarbamate, di - octadecyl - N : N' - di - (chloromethyl)-1:5-naphthylenedicarbamate, di-octadecyl-N:N'- di-(chloromethyl) - 2 - methoxy-1:4- phenylenedicarbamate, di - octadecyl - N:N'-di- (chloromethyl)-2-chloro - 1:4 - phenylenedicarbamate, di-octadecyl-N:N'-di-(chloromethyl)-6-methyl - 1 : 3 - phenylenedicarbamate; the di-(chloromethyl)-dicarbamates having the formulae respectively

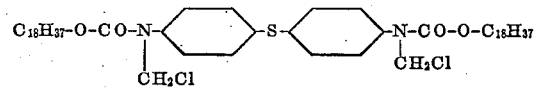

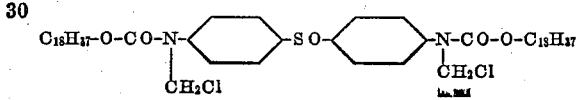

and

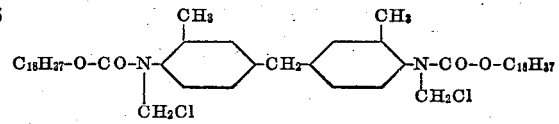

and also the corresponding di-dodecyl, di-cetyl, and di-montanyl derivatives as well as the di- (bromomethyl)-dicarbamates corresponding to any of the above.

These intermediate bis-halogen-methyl compounds in turn may be prepared by reacting with paraformaldehyde and hydrogen halide, in an inert organic solvent, upon the corresponding compound of formula

which in turn may be prepared by reacting the corresponding alkyl amides or carbamates, respectively, with a convenient aldehyde, for instance formaldehyde, according to French Patent No. 782,330. An alternative method is to react a diamine of the formula NH₂—Z—NH₂, wherein Z has the same significance as above, with two moles of a carbonyl chloride compound of the formula R—COCl or R—O—COCl, and then reacting the resulting bis-compound with paraformaldehyde and hydrogen halide, in an inert organic solvent, as described for instance with respect to one of these types of compounds in copending application of Rogers, Serial No. 288,059.

Instead of paraformaldehyde, trioxymethylene, trioxane or any other source of formaldehyde soluble in organic solvents may be used.

The treatment of the above bis-halogenmethyl compounds with thiourea may be effected in an inert organic solvent, for instance acetone, methyl-ethyl-ketone or ethyl acetate; or it may be effected simply by mixing the finely powdered thiourea with the bis-halogen-methyl compound. The treatment is believed to react one thiourea molecule with each halogen-methyl group, linking the CH₂ group to the sulfur atom, and shifting the halogen atom into one of the urea nitrogen atoms, resulting in a thiouronium compound as indicated by the first formula hereinabove.

The resulting compounds are very soluble in water and decompose on warming. Upon addition of a weak base such as ammonia to the aqueous solution, the free amine is precipitated, which may be brought back into solution unchanged by addition of an acid, provided this is added shortly after the base has been added.

If a small amount of caustic soda is added to the aqueous solution the base is precipitated first, but it goes back into solution when the solution is warmed just a little. This is probably due to the formation of a mercaptan of the following formula

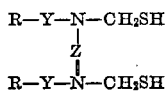

Upon further heating the alkaline solution becomes turbid again and a very insoluble precipitate is formed, the formula of which is unknown.

The novel compounds find utility in the aqueous treatment of textile fiber, for instance cotton, wool, rayon or nylon, for various purposes. They are particularly valuable for their capacity to impart a soft feel to the fiber, and for their further capacity to impart wash-resistant, water-repellancy to such textile material, when applied thereto from an aqueous bath whereupon the material is dried and baked at a temperature between 100 and 150° C. according to the process of British Patent No. 477,991 or other patents relating to the same field.

These products may also be applied jointly with formaldehyde to produce simultaneously a water-repellant and crease-resistant fabric. The use of sodium acetate or other buffers during the impregnation is also desirable, to prevent or diminish tendering of the cellulosic material.

Without limiting my invention to any particular procedure, the following examples are given to illustrate my preferred mode of operation. Parts mentioned are by weight.

*Example 1*

137 parts of methylene-distearamide (French Patent No. 782,330) were suspended in 250 parts of carbon tetrachloride then heated to 50° C., whereupon 30 parts of paraformaldehyde were added. Dry hydrogen chloride was passed in for 7 hours; the aqueous phase was then separated from the carbon tetrachloride, and the latter was distilled off under vacuum. The thick mass which still contained some CCl₄ was diluted with 200 parts of acetone and 60 parts of finely powdered thiourea were added, while agitating vigorously. The reaction product separated as a heavy crystalline material which was completely soluble in water. It probably corresponds to the formula

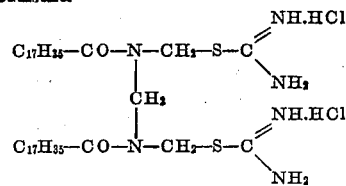

When cotton jean cloth was impregnated with a 1% solution of this product, containing some sodium acetate and some formaldehyde, and then baked for 3 minutes at 150° C., the fabric was strongly water-repellant and crease-resisting.

*Example 2*

30 parts of methylene-dioctadecyl urethane, which has a melting point of 116° C. and was prepared by heating 2 mols octadecyl urethane with one mol (on basis of CH₂O) of paraformaldehyde for a few hours to 150° C., was mixed with 10 parts of paraformaldehyde and suspended in 100 parts of carbon tetrachloride. Hydrogen chloride gas was then passed in at 50° C. until a sample of the product when treated with thiourea became soluble in water. The carbon tetrachloride and excess hydrogen chloride were removed in vacuo. The residue was diluted with acetone and an acetonic solution of 10 grams of thiourea was added. The hydrochloride of the isothiourea separated out as a nicely crystallizing material. It probably has the formula

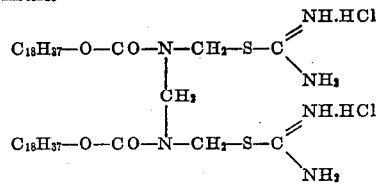

It is readily soluble in water and decomposes upon heating. It may be purified by dissolving it in a small amount of methyl alcohol and precipitating it therefrom with acetone.

When a cotton fabric was impregnated with a 1% aqueous solution of this product and then subjected to a heat treatment the fabric was strongly water-repellant, and this property was not destroyed by washing or dry cleaning.

*Example 3*

35 parts (i. e. ½₀ mol) of di-octadecyl-p-phenylene-dicarbamate of the formula

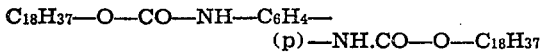

(melting point 146° C., made by condensing two molecular proportions of octadecyl chloroformate with one molecular proportion of p-phenylenediamine) and 6 parts of paraformaldehyde (i. e. 1/10 mol) are mixed with 500 parts of benzene. The mixture is stirred and heated. The temperature is kept at 60° C. while dry hydrogen chloride is passed in. As the reaction proceeds water separates out and the liquid becomes turbid. Eventually the liquid becomes clear again, and the water separates from it and forms a separate layer. The lower aqueous layer is then run to waste. The benzene is distilled off from the upper layer, preferably under subatmospheric pressure. The residue left in the still is di-octadecyl-N:N'-di-(chloromethyl)-p-phenylene dicarbamate of the formula

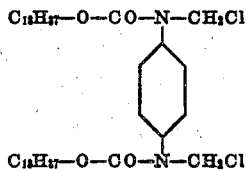

This chloride is then dissolved in 100 parts of acetone, and 20 parts of finely powdered thiourea are added while agitating vigorously. The hydrochloride of the new compound separates as a white mass which is soluble in water.

When a cotton fabric is impregnated with a 1% aqueous solution of the above compound, containing some sodium acetate, and then baked for a few minutes at 150° C. it becomes strongly water-repellant.

In the above examples, instead of methylene-distearamide, other methylene diamides may be used, for instance methylene-dipalmityl-amide, methylene-dimontanic-acid-amide, methylene-dihexadecyl-carbamate or dioctadecyl-meta-phenylene dicarbamate.

Thiourea on the other hand may be substituted by alkyl triourea, ethyl thiourea, or any other thiourea which is capable of reacting in the iso-form.

Many other variations will be apparent to those skilled in this art, without departing from the spirit of this invention.

I claim:

1. Chemical compounds of the general formula

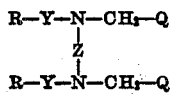

wherein R is an aliphatic hydrocarbon radical containing at least 7 carbon atoms; Y is a link selected from the group consisting of CO and O—CO, Z stands for a divalent radical free from water-solubilizing groups, while Q designates the radical of an isothiouronium halide which is attached to the respective $CH_2$ group above shown through the sulfur atom.

2. Chemical compounds of the general formula

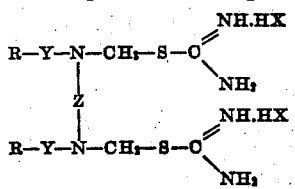

wherein R is an aliphatic hydrocarbon radical containing at least 7 carbon atoms; Y is a link selected from the group consisting of CO and O—CO, Z stands for a divalent hydrocarbon radical, while X stands for halogen.

3. Chemical compounds of the general formula

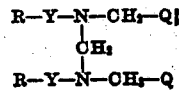

wherein R is an aliphatic hydrocarbon radical containing at least 7 carbon atoms; Y is a link selected from the group consisting of CO and O—CO, while Q designates the radical of an isothiouronium halide which is attached to the respective $CH_2$ group above shown through the sulfur atom.

4. A water-soluble chemical compound being the reaction product of thiourea and a bischloromethyl compound and corresponding to the general formula

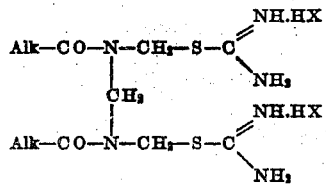

wherein Alk designates an alkyl radical having from 8 to 20 carbon atoms in its structure, while X stands for halogen.

5. A water-soluble chemical compound being the reaction product of thiourea and a bischloromethyl compound and corresponding to the general formula

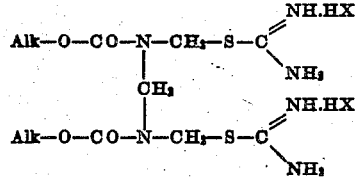

wherein Alk designates an alkyl radical having from 8 to 20 carbon atoms in its structure, while X stands for halogen.

6. The bis-thiouronium chloride of bis-(N-methylene)-distearamido-methane.

7. The bis-thiouronium chloride of bis-(N-methylene)-methylene bis-(octadecylurethane).

8. The process of producing water-soluble organic compounds, which comprises reacting with a thiourea on a bis-halogen-methyl compound of the general formula

wherein R is an aliphatic hydrocarbon radical containing at least 7 carbon atoms; Y is a link selected from the group consisting of CO and O—CO, Z stands for a divalent radical free from water-solubilizing groups, while X stands for halogen.

9. The process of producing water-soluble organic compounds, which comprises reacting with thiourea on a bis-chloromethyl compound of the general formula

wherein R is an aliphatic hydrocarbon radical containing at least 7 carbon atoms; Y is a link selected from the group consisting of CO and O—CO, Z stands for a divalent hydrocarbon radical.

10. The process of producing water-soluble organic compounds, which comprises reacting with a thiourea on a bis-halogen-methyl compound of the general formula $$\begin{array}{c} R-Y-N-CH_2X \\ | \\ CH_2 \\ | \\ R-Y-N-CH_2X \end{array}$$

wherein R is an aliphatic hydrocarbon radical containing at least 7 carbon atoms; Y is a link selected from the group consisting of CO and O—CO, while X stands for halogen.

11. The process which comprises reacting with thiourea on bis-N-chloro-methyl-distearamido-methane until the compound shows substantially complete water-solubility, and recovering the reaction product.

12. The process which comprises reacting with thiourea on bis-N-chloro-methyl-methylene-di-(octadecylurethane) until the compound shows substantially complete water-solubility, and recovering the reaction product.

13. Chemical compounds of the general formula $$\begin{array}{c} R-Y-N-CH_2-Q \\ | \\ Z \\ | \\ R-Y-N-CH_2-Q \end{array}$$

wherein R is a non-aromatic hydrocarbon radical containing at least 7 carbon atoms; Y is a link selected from the group consisting of CO and O—CO, Z stands for a divalent radical free from water-solubilizing groups, while Q designates the radical of an isothiouronium halide which is attached to the respective CH₂ group above shown through the sulfur atom.

14. The process of producing water-soluble organic compounds, which comprises reacting with a thiourea on a bis-halogen-methyl compound of the general formula $$\begin{array}{c} R-Y-N-CH_2X \\ | \\ Z \\ | \\ R-Y-N-CH_2X \end{array}$$

wherein R is a non-aromatic hydrocarbon radical containing at least 7 carbon atoms; Y is a link selected from the group consisting of CO and O—CO, Z stands for a divalent radical free from water-solubilizing groups, while X stands for halogen.

JOSEF PIKL.